United States Patent
Price et al.

(10) Patent No.: US 8,181,969 B2
(45) Date of Patent: May 22, 2012

(54) LUBRICATION BLOCKING SEAL

(75) Inventors: James W. Price, Camarillo, CA (US); Andy Austin, Ventura, CA (US)

(73) Assignee: Diversified Minerals Inc., Oxnard, CA (US)

( * ) Notice: Subject to any disclaimer, the term of this patent is extended or adjusted under 35 U.S.C. 154(b) by 1032 days.

(21) Appl. No.: 12/109,764

(22) Filed: Apr. 25, 2008

(65) Prior Publication Data

US 2009/0267305 A1    Oct. 29, 2009

(51) Int. Cl.
*F16L 21/02*    (2006.01)

(52) U.S. Cl. ......................................... 277/514; 277/512

(58) Field of Classification Search .................. 277/510, 277/511, 512, 513, 514
See application file for complete search history.

(56) References Cited

U.S. PATENT DOCUMENTS

| | | | | |
|---|---|---|---|---|
| 2,971,783 | A | * | 2/1961 | Laser ............................ 277/359 |
| 3,044,788 | A | * | 7/1962 | Korn ............................. 277/356 |
| 3,119,623 | A | * | 1/1964 | Shevchenko .................. 277/581 |
| 3,332,536 | A | | 7/1967 | Ebly et al. |
| 3,624,809 | A | * | 11/1971 | Beninga ........................ 277/405 |
| 3,869,131 | A | | 3/1975 | Derner |
| 3,932,006 | A | | 1/1976 | Tertinek et al. |
| 3,934,311 | A | | 1/1976 | Thompson |
| 4,268,331 | A | | 5/1981 | Stevens |
| 4,699,575 | A | | 10/1987 | Geisel et al. |
| 4,776,709 | A | | 10/1988 | Tooley |
| 4,850,723 | A | | 7/1989 | Whiteman, Jr. |
| 5,022,659 | A | | 6/1991 | Otto |
| 5,188,214 | A | | 2/1993 | Uttke et al. |
| 5,277,489 | A | | 1/1994 | Hamm |
| 5,480,160 | A | * | 1/1996 | Harms ........................... 277/347 |
| 5,803,463 | A | | 9/1998 | Brooks et al. |
| 5,908,248 | A | | 6/1999 | Nisley |
| 6,406,026 | B1 | * | 6/2002 | Oldenburg ..................... 277/353 |
| 6,517,083 | B2 | * | 2/2003 | Yamada et al. ............... 277/562 |
| 6,932,512 | B2 | | 8/2005 | Cox et al. |
| 6,991,234 | B2 | | 1/2006 | Oldenberg |
| 2005/0206090 | A1 | | 9/2005 | Bunn |
| 2007/0070806 | A1 | | 3/2007 | Swisher |

* cited by examiner

*Primary Examiner* — Gilbert Lee

(74) *Attorney, Agent, or Firm* — David A. Belasco; Belasco Jacobs & Townsley, LLP

(57) ABSTRACT

A lubrication blocking seal includes a hollow body that has upper and lower planar surfaces, a surrounding wall, a reservoir area and an open top. The body has upper and lower seal-receiving recesses located in the upper and lower planar surfaces, and a lower central aperture sized and shaped to fit closely about a rotating shaft. A cover is sized and shaped to seal to the hollow body and has an upper central aperture sized and shaped to fit closely about the rotating shaft and means for mounting a bearing about the shaft and to the cover. A lower seal is sized and shaped to fit closely about the rotating shaft and into the lower seal-receiving recess. An upper seal is sized and shaped to fit closely about the rotating shaft and into the upper seal-receiving recess. A quantity of lubricating material sufficient to fill the reservoir area is provided.

10 Claims, 3 Drawing Sheets

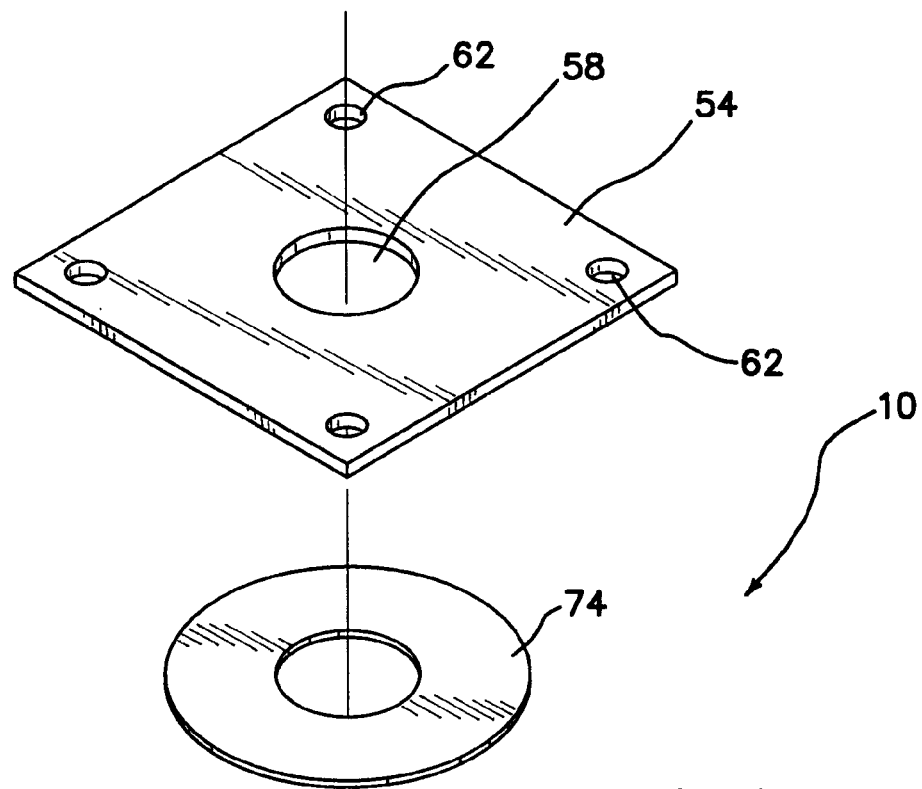
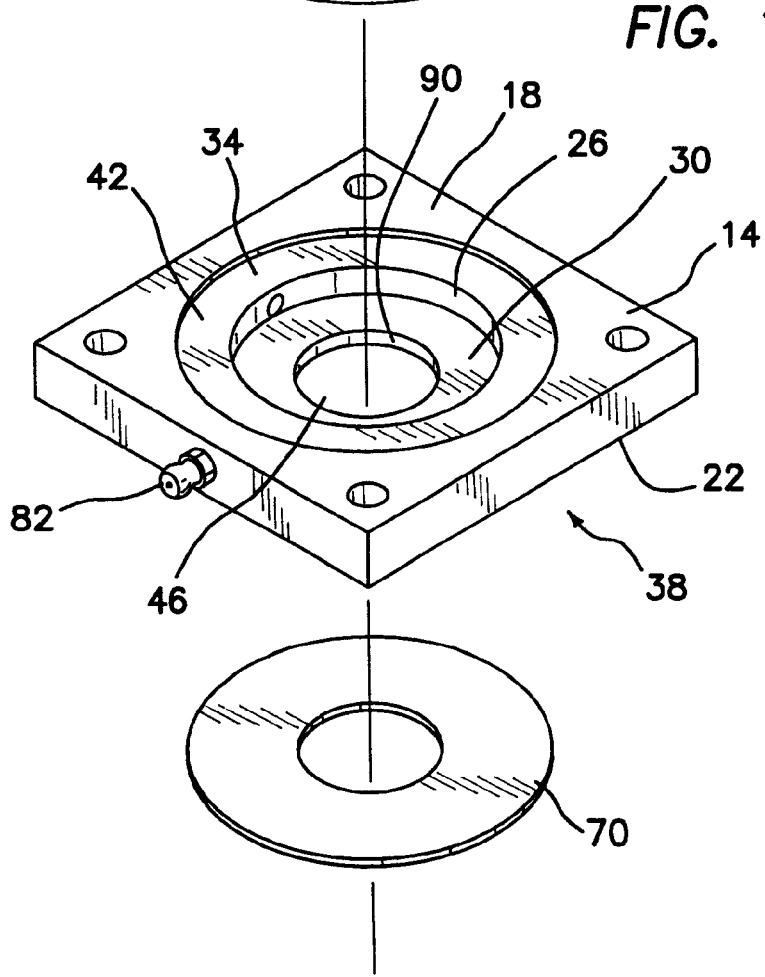
FIG. 1

LUBRICATION BLOCKING SEAL

FIELD OF INVENTION

This invention relates to the field of lubricating systems for rotating shafts, and more specifically to systems designed to prevent abrasive materials from entering bearings supporting such shafts.

BACKGROUND OF THE INVENTION

Transfer of powdered or particulate materials between containers typically involves the use of screw conveyors and similar equipment. This equipment includes heavy duty rotating shafts running in ball, roller or sleeve bearings. These bearings can be easily destroyed through the introduction of the particulate material into the bearings due to the abrasive nature of the material. Even though the bearings are usually running in a liquid or viscous lubricant, such lubricants are easily contaminated with abrasives should they enter the bearing. Such contamination will rapidly destroy such bearings, causing costly shutdown of the transfer equipment for bearing replacement. Further, as the bearings must be immediately replaced to prevent catastrophic failure of the transfer system, the timing of the bearing replacement may prove inconvenient, as in during a sizable material transfer. An improved system would allow for delay in replacing the bearings while a transfer is completed or crews can be conveniently available. A variety of devices and bearing systems have been developed to prevent damage to shaft bearings by abrasive materials.

U.S. Pat. No. 5,908,248, issued to Nisley, discloses a shaft bearing having improved seal arrangement. The seal permits the egress of foreign matter from a bearing area and inhibits ingress of such material which utilizes a lubricant fitting to introduce the lubricant into the bearing area, such that foreign material is purged from the area while inhibiting the ingress of such contaminants into the bearing area. A bearing seal includes a base portion and an annular lip that abuts an inner ring, such that lubricant under pressure in the bearing area may be forced between the seal and the inner ring and out of the bearing area through a gap. The lubricant in the chamber may be forced between the lip and a stamping, such that foreign matter such as moisture and other contaminants cannot pass back in the other direction. The lubricant dam exerts pressure on the lip encouraging the egress of lubricants from the lubricant dam out of the bearing, and thus provides a purging path to remove contaminant material introduced to the bearing.

U.S. Pat. No. 4,776,709, issued to Tooley is directed to a seal for shaft bearings that provides for the bearing assembly to be purged by the outward flowing of lubricant and at the same time the bearing assembly may be protected from the introduction of foreign matter. A housing includes a bearing assembly comprising an outer race and inner race, and two rows of roller bearings. The assembly is lubricated through a fixture. One embodiment includes a V-ring seal which permits the bearing to be purged by the introduction of lubricant from the bearing, and at the same time, prevents the introduction of dirt moisture, and other foreign matter through the seal into the bearing by the seating of the lip on the annular surface of the ring.

U.S. Patent Publication No. 2007/0070806, issued to Swisher is directed to a mortar mixer and trunnion assembly. The seals for the trunnions are particularly adapted for use in mortar mixing drums in which the seals partition a portion of the interior space to define a first chamber for carrying grease and a second interior space which defines a chamber which forms a positive seal to prevent contaminated grease from entering the bearing. A pair of Zerk fittings is used to provide grease to the chambers in order to provide the necessary lubrication for the shaft while preventing contaminated grease from entering the bearing surfaces.

U.S. Pat. No. 6,932,512, issued to Cox et al. is directed to an agricultural rockshaft bearing block structure and wear inserts. The bearing block structure utilizes a two-piece ultra high molecular weight polyethylene wear insert so as to limit the wear between the steel rockshaft and the metallic bearing block. The bearing blocks often include grease fittings for lubrication to reduce the wear, but introduction of contaminating materials into the lubricants often accelerates the wear and it is necessary to purge the contaminants from the rockshaft and bearing block while utilizing UHMW materials to limit the wear.

U.S. Pat. No. 5,188,214, issued to Uttke et al. discloses an end seal for idler roller. The conveyor system includes a plurality of idler rollers journaled for rotation around individual stationary shafts. In order to protect against the entry of contaminants an end seal assembly, including an inner seal member mounted to the roller and an outer seal member mounted to the stationary shaft are provided. The principal feature of the invention is that the idler end seal is adapted for use in conveyor systems that carry materials generating abrasive airborne dust, and thus it is necessary to prevent this abrasive material from entering the bearing areas.

It is an objective of the present invention to provide a system to mount bearings to support rotating shafts for transfer of particulate and abrasive materials. It is a further objective to provide such a system that will prevent contamination and subsequent rapid wear of such shafts by the subject materials. It is a still further objective of the invention to use lubricating materials to prevent unwanted movement of abrasive materials along the rotating shaft and into the bearing. It is yet a further objective to provide a weatherproof and dimensionally stable mounting structure for the bearing and the shaft. Finally, it is an objective of the present invention to provide a back-up bearing surface that is instantly available should the bearing fail.

While some of the objectives of the present invention are disclosed in the prior art, none of the inventions found address all of the requirements identified.

SUMMARY OF THE INVENTION

The present invention addresses all of the deficiencies of prior art lubrication blocking seal inventions and satisfies all of the objectives described above.

(1) A lubrication blocking seal providing the desired features may be constructed from the following components. A hollow body is provided. The body has an upper planar surface, a lower planar surface, a surrounding wall, a reservoir area, an open top, a lower seal-receiving recess located in the lower planar surface, an upper seal-receiving recess located in the upper planar surface and a lower central aperture sized and shaped to fit closely about a rotating shaft. A cover is provided. The cover is sized and shaped to seal to the hollow body. The cover has an upper central aperture sized and shaped to fit closely about the rotating shaft and means for mounting a bearing about the shaft and to the cover. A lower seal is provided. The lower seal is sized and shaped to fit closely about the rotating shaft and into the lower seal-receiving recess. An upper seal is provided. The upper seal is sized and shaped to fit closely about the rotating shaft and into the upper seal-receiving recess. A quantity of lubricating material sufficient to substantially fill the reservoir area is provided.

(2) In a variant of the invention, either the hollow body or the cover includes a lubricant introduction fitting.

(3) In another variant, either the hollow body or the cover includes a lubricant overflow fitting.

(4) In still another variant, material surrounding at least one of the lower central aperture and the upper central aperture is formed of abrasion resistant material. The abrasion resistant material is softer than material forming the rotating shaft.

(5) In yet another variant, the abrasion resistant material is selected from the group consisting of aluminum, bronze, wood, plastic and Ultra High Molecular Weight (UHMW) plastic.

(6) In a further variant, at least one of the hollow body and the cover is formed of the abrasion resistant material.

(7) In still a further variant, the UHMW plastic is selected from the group consisting of Polyoxymethylene (Delrin®), polyamide (Nylon®), Polytetrafluoroethylene (Teflon-PTFE®), Perfluoroalkoxy (Teflon-PFA®), Fluorinated ethylene propylen (Teflon-FEP®), Polyphenylene Oxide and polystyrene (Norel® resin), Polyetheretherketone (PEEKS®), plastic polyoxymethylene (Acetal®), Polyoxymethylene (Celcon®, Kepital®), fluoropolymers (Turcite®, Halar®), and polyimide-based polymers (Vespel®).

(8) In yet a further variant, the upper and lower seals are formed of resilient material and are impervious to the lubricating material.

(9) In another variant of the invention, the upper and lower seals are formed of cloth inserted polychloroprene (Neoprene® synthetic rubber).

(10) In still another variant, the lubricating material is maintained at a pressure exceeding a pressure of material moving along said shaft toward said bearing.

(11) In still another variant, the lubricating material is selected from the list consisting of full synthetic grease with suspended PTFE (Teflon®), petroleum based grease with suspended PTFE (Teflon®), molybdenum based grease, lithium based grease, high impact grease, extreme pressure grease, synthetic grease and petroleum based grease.

(12) In a final variant of the invention, the lubricating material has a melting point in excess of the melting point of said abrasion resistant material.

An appreciation of the other aims and objectives of the present invention and an understanding of it may be achieved by referring to the accompanying drawings and the detailed description of a preferred embodiment.

DESCRIPTION OF THE DRAWINGS

FIG. 1 is an exploded perspective view of the preferred embodiment of the invention including the hollow body, the cover and upper and lower seals;

DETAILED DESCRIPTION OF THE PREFERRED EMBODIMENT (1) FIGS. 1-3 illustrate a lubrication blocking seal 10 providing the desired features that may be constructed from the following components. A hollow body 14 is provided. The body 14 has an upper planar surface 18, a lower planar surface 22, a surrounding wall 26, a reservoir area 30, an open top 34, a lower seal-receiving recess 38 located in the lower planar surface 22, an upper seal-receiving recess 42 located in the upper planar surface 18 and a lower central aperture 46 sized and shaped to fit closely about a rotating shaft 50. A cover 54 is provided. The cover 54 is sized and shaped to seal to the hollow body 14. The cover has an upper central aperture 58 sized and shaped to fit closely about the rotating shaft 50 and means 62 for mounting a bearing 66 about the shaft 50 and to the cover 54. A lower seal 70 is provided. The lower seal 70 is sized and shaped to fit closely about the rotating shaft 50 and into the lower seal-receiving recess 38. An upper seal 74 is provided. The upper seal 74 is sized and shaped to fit closely about the rotating shaft 50 and into the upper seal-receiving recess 42. A quantity of lubricating material 78 sufficient to substantially fill the reservoir area 30 is provided.

Figure 2:
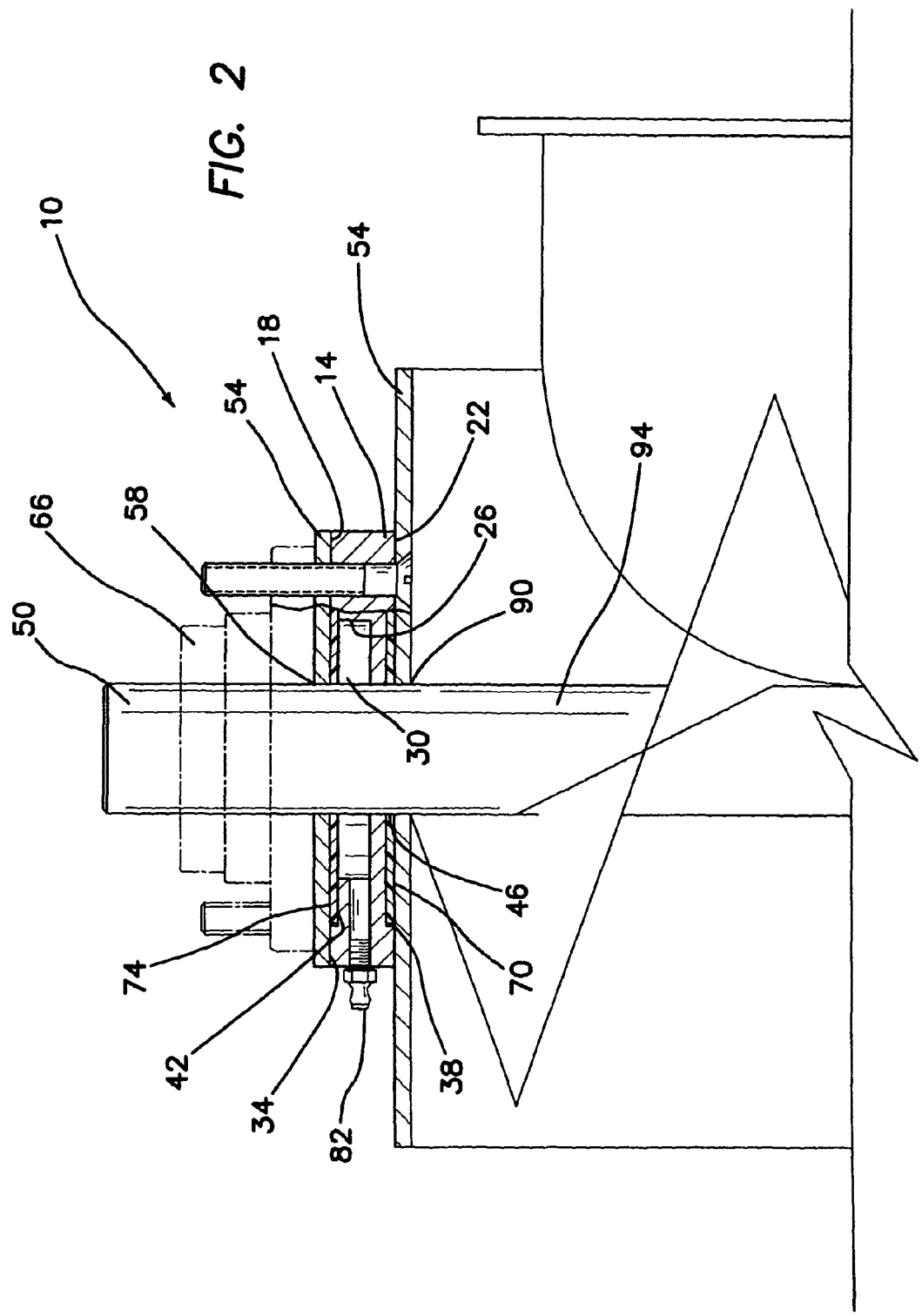
FIG. 2 is a sectional side elevational view of the FIG. 1 embodiment mounted to a screw conveyor with a bearing attached and the seals and reservoir in view.
Figure 3:
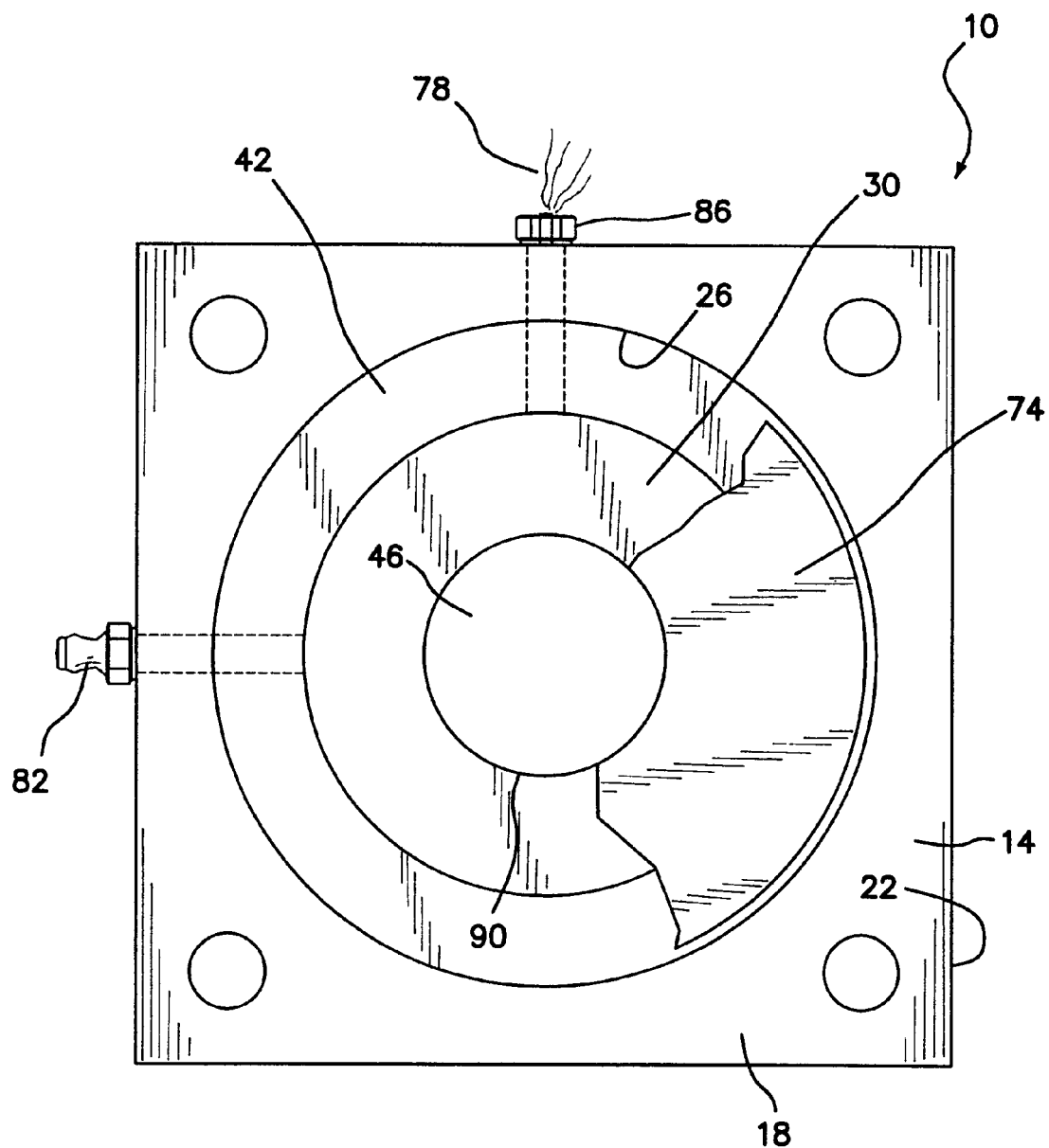
FIG. 3 is a partial cutaway plan view of the FIG. 1 embodiment illustrating the upper seal, the upper seal-receiving recess, the reservoir area, the lubricant introduction fitting and the lubricant overflow fitting.

(2) In a variant of the invention, either the hollow body 14 or the cover 54 includes a lubricant introduction fitting 82.

(3) In another variant, either the hollow body 14 or the cover 54 includes a lubricant overflow fitting 86.

(4) In still another variant, material surrounding at least one of the lower central aperture 46 and the upper central aperture 58 is formed of abrasion resistant material 90. The abrasion resistant material 90 is softer than material 94 forming the rotating shaft 50.

(5) In yet another variant, the abrasion resistant material 90 is selected from the group consisting of aluminum, bronze, wood, plastic and Ultra High Molecular Weight (UHMW) plastic.

(6) In a further variant, at least one of the hollow body 14 and the cover 54 is formed of the abrasion resistant material 90.

(7) In still a further variant, the UHMW plastic is selected from the group consisting of Polyoxymethylene (Delrin®), polyamide (Nylon®), Polytetrafluoroethylene (Teflon-PTFE®), Perfluoroalkoxy (Teflon-PFA®), Fluorinated ethylene propylen (Teflon-FEP®), Polyphenylene Oxide and polystyrene (Norel® resin), Polyetheretherketone (PEEK®), plastic polyoxymethylene (Acetal®), Polyoxymethylene (Celcon®, Kepital®), fluoropolymers (Turcite®, Halar®), and polyimide-based polymers (Vespel®).

(8) In yet a further variant, the upper 74 and lower 70 seals are formed of resilient material 98 and are impervious to the lubricating material 78.

(9) In another variant of the invention, the upper 74 and lower 70 seals are formed of cloth inserted polychloroprene (Neoprene® synthetic rubber)

(10) In still another variant, the lubricating material 78 is maintained at a pressure exceeding a pressure of material moving along said shaft 50 toward said bearing 66.

(11) In another variant, the lubricating material 78 is selected from the list consisting of: full synthetic grease with suspended PTFE (Teflon®), petroleum based grease with suspended PTFE (Teflon®), molybdenum based grease, lithium based grease, high impact grease, extreme pressure grease, synthetic grease and petroleum based grease.

(12) In a final variant of the invention, the lubricating material has a melting point in excess of the melting point of said abrasion resistant material.

The lubrication blocking seal 10 has been described with reference to particular embodiments. Other modifications and enhancements can be made without departing from the spirit and scope of the claims that follow.

The invention claimed is:

1. A lubrication blocking seal, comprising:
a hollow body, said body having an upper planar surface, a lower planar surface, a surrounding wall, a reservoir area, an open top, an upper seal-receiving recess disposed in said upper planar surface, a lower seal-receiving recess disposed in said lower planar surface and a lower central aperture sized and shaped to fit slidably about a rotating shaft;
a cover, said cover being sized and shaped to fit sealably to said hollow body, an upper central aperture sized and shaped to fit slidably about said rotating shaft and means for mounting a bearing about said shaft and to said cover;
a lower seal, said lower seal being sized and shaped to fit slidably about said rotating shaft and into said lower seal-receiving recess;
an upper seal, said upper seal being sized and shaped to fit slidably about said rotating shaft and into said upper seal-receiving recess;
a lubricant introduction fitting, said fitting penetrating radially through at least one of said hollow body and said cover;
at least one back-up bearing surface, said back-up bearing surface being integral with either of said cover and said hollow body and being formed of abrasion resistant material surrounding at least one of said lower central aperture and said upper central aperture, said abrasion resistant material being softer than material forming said rotating shaft;
a quantity of lubricating material sufficient to substantially fill said reservoir area; and
wherein said back-up bearing surface is instantly available should either of said lubricant be missing and said bearing fail.

2. The lubrication blocking seal, as described in claim 1, wherein either of said hollow body and said cover further comprising a lubricant overflow fitting.

3. The lubrication blocking seal, as described in claim 1, wherein said abrasion resistant material is selected from the group consisting of:
Aluminum, bronze, wood, plastic and Ultra High Molecular Weight (UHMW) plastic.

4. The lubrication blocking seal, as described in claim 3, wherein said UHMW plastic is selected from the group consisting of:
Polyoxymethylene (Delrin®), polyamide (Nylon®), Polytetrafluoroethylene (Teflon-PTFE®), Perfluoroalkoxy (Teflon-PFA®), Fluorinated ethylene propylen (Teflon-FEP®), Polyphenylene Oxide and polystyrene (Morel® resin), Polyetheretherketone (PEEK®), plastic polyoxymethylene (Acetal ®), Polyoxymethylene (Celcon®, Kepital®), fluoropolymers (Turcite®, Halar®), and polyimide-based polymers (Vespel®).

5. The lubrication blocking seal, as described in claim 1, wherein at least one of said hollow body and said cover is formed of said abrasion resistant material.

6. The lubrication blocking seal, as described in claim 1, wherein said upper and lower seals are formed of resilient material and are impervious to said lubricating material.

7. The lubrication blocking seal, as described in claim 6, wherein said upper and lower seals are formed of cloth inserted polychloroprene (Neoprene® synthetic rubber).

8. The lubrication blocking seal, as described in claim 1, wherein said lubricating material is maintained at a pressure exceeding a pressure of material moving along said shaft toward said bearing.

9. The lubrication blocking seal, as described in claim 1, wherein said lubricating material is selected from the list consisting of:
full synthetic grease with suspended PTFE (Teflon®), petroleum based grease with suspended PTFE (Teflon®), molybdenum based grease, lithium based grease, high impact grease, extreme pressure grease, synthetic grease and petroleum based grease.

10. The lubrication blocking seal, as described in claim 1, wherein said lubricating material has a melting point in excess of the melting point of said abrasion resistant material.

* * * * *